(12) United States Patent
Tu et al.

(10) Patent No.: US 10,375,228 B2
(45) Date of Patent: Aug. 6, 2019

(54) SYSTEMS AND METHODS FOR DETECTING CALL HANDEDNESS

(71) Applicant: Apple Inc., Cupertino, CA (US)

(72) Inventors: Xiaoyuan Tu, Sunnyvale, CA (US); Purvi J. Desai, Mountain View, CA (US); Maulik V. Choksi, Cupertino, CA (US); Anil Kandangath, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/695,351

(22) Filed: Sep. 5, 2017

(65) Prior Publication Data
US 2019/0075201 A1 Mar. 7, 2019

(51) Int. Cl.
*H04W 4/02* (2018.01)
*H04W 88/02* (2009.01)
*H04M 1/725* (2006.01)

(52) U.S. Cl.
CPC ....... *H04M 1/72569* (2013.01); *H04W 4/026* (2013.01); *H04W 88/02* (2013.01); *H04M 2250/10* (2013.01); *H04M 2250/12* (2013.01)

(58) Field of Classification Search
CPC . H04W 4/027; H04W 4/026; H04W 52/0254; H04W 88/02; H04W 12/00508; H04M 1/72569; H04M 2250/10; H04M 2250/12

USPC .................................. 455/575.5, 575.7, 117
See application file for complete search history.

(56) References Cited

U.S. PATENT DOCUMENTS

| | | | | |
|---|---|---|---|---|
| 6,122,960 | A * | 9/2000 | Hutchings | A63B 24/00 73/493 |
| 2012/0202560 | A1* | 8/2012 | Donaldson | H04M 1/6066 455/552.1 |
| 2014/0323141 | A1* | 10/2014 | Boos | H04B 7/02 455/452.1 |
| 2016/0067547 | A1* | 3/2016 | Anthony | G01P 15/0891 702/141 |

* cited by examiner

*Primary Examiner* — Philip Sobutka
(74) *Attorney, Agent, or Firm* — DLA Piper LLP US; Kristoffer W. Lange

(57) ABSTRACT

Methods and systems for improving signal reception and call quality by detecting a user's handedness of holding a mobile device during a call are described. Motion data of the mobile device can be collected by one or more motion sensor. A screen tilt angle can be determined and compared with a threshold tilt angle. A screen swivel angle can be determined and compared with a threshold swivel angle. A call handedness can be determined based on the screen swivel angle. One or more parameters of an antenna can be adjusted based on the call handedness.

19 Claims, 7 Drawing Sheets

SYSTEMS AND METHODS FOR DETECTING CALL HANDEDNESS

FIELD

The present disclosure relates to detecting a user's handedness during a call.

BACKGROUND

When a person is in a phone call using a mobile device, the person may hold the mobile device to his or her ear with either left hand or right hand, depending on the user's preference. However, this may present a challenge to the wireless reception and call quality which may be related to the position and orientation of the mobile device. Accordingly, it is desirable to provide methods and systems of detecting a user's call handedness.

SUMMARY

The present disclosure relates to a method for improving signal reception and call quality of a mobile device while a user is holding the mobile device during a call. In some embodiments, the method can include: collecting, by one or more motion sensors of the mobile device, motion data of the mobile device; determining, by a processor circuit of the mobile device, one or more constraints are met based on the motion data; determining, by the processor circuit, a screen swivel angle of the mobile device; determining, by the processor circuit, a handedness of the user while holding the mobile device based on the determined screen swivel angle; and adjusting, by the processor circuit, one or more parameters of an antenna of the mobile device based on the determined handedness, wherein the adjustment improves the signal reception and call quality of the mobile device. In some embodiments, the one or more parameters of the antenna can include at least one of gain, radiation pattern, power or frequency.

In some embodiments, the processor circuit can filter the collected motion data using a low-pass filter and determine the screen swivel angle of the mobile device based on the filtered motion data. In some embodiments, the low-pass filter can include a cut-off frequency of between 1 Hz and 50 Hz.

In some embodiments, the method can include calculating, by the processor circuit, a screen tilt angle of the mobile device based on the motion data; and determining, by the processor circuit, the determined screen tilt angle is less than a threshold tilt angle. In some embodiments, the threshold tilt angle can be substantially 55 degrees.

In some embodiments, the method can include determining, by the processor circuit, the determined screen swivel angle is greater a threshold swivel angle. In some embodiments, the threshold swivel angle can be substantially 25 degrees.

In some embodiments, the method can include determining, by the processor circuit, a mean acceleration of the mobile device; and determining, by the processor circuit, the mean acceleration is within a pre-defined acceleration range. In some embodiments, the pre-defined acceleration range can be 0.75 g to 1.25 g.

In some embodiments, the one or more motion sensor can include at least one of an accelerometer or a gyroscope.

The present disclosure also relates to a system for improving signal reception and call quality of a mobile device while a user is hold the mobile device during a call. In some embodiments, the system can include an antenna, one or more motion sensors configured to collect motion data of the mobile device, and a processor circuit coupled to the antenna and the one or more motion sensor. The processor circuit is configured to execute instructions causing the processor circuit to: determine one or more constraints are met based on the motion data; determine a screen swivel angle of the mobile device based on the motion data; determine a handedness of the user while holding the mobile device based on the determined screen swivel angle, and adjust one or more parameters of the antenna based on the determined handedness of the user, wherein the adjustment improves the signal reception and call quality of the mobile device.

Other features and advantages will become apparent from the following detailed description and drawings.

BRIEF DESCRIPTION OF THE DRAWINGS

Various objects, features, and advantages of the present disclosure can be more fully appreciated with reference to the following detailed description of the present disclosure when considered in connection with the following drawings, in which like reference numerals identify like elements.

DETAILED DESCRIPTION

In the following description, numerous specific details are set forth regarding the systems, methods and media of the present disclosure and the environment in which such systems, methods and media may operate, etc., in order to provide a thorough understanding of the present disclosure. It will be apparent to one skilled in the art, however, that the present disclosure may be practiced without such specific details, and that certain features, which are well known in the art, are not described in the detail in order to avoid complication of the present disclosure. In addition, it will be understood that the examples provided below are exemplary, and that it is contemplated that there are other systems, methods, and media that are within the scope of the present disclosure.

Figure 1:
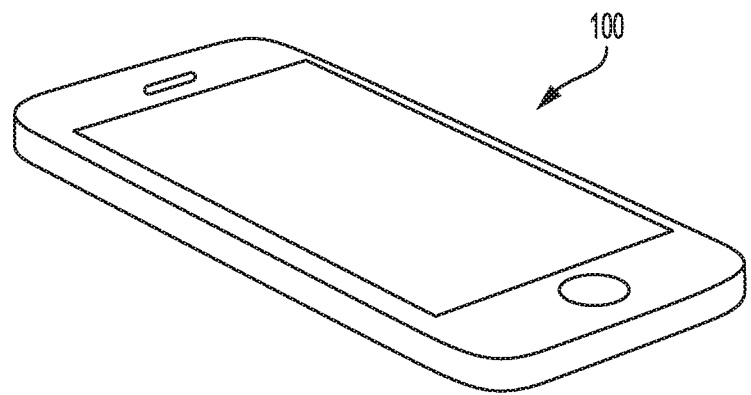
FIG. 1 shows an example of a mobile device according to some embodiments of the present disclosure.

FIG. 1 shows an example of a mobile device 100, according to some embodiments of the present disclosure. In some embodiments, the mobile device 100 can be a smartphone, tablet, or similar portable communication device.

Figure 2:
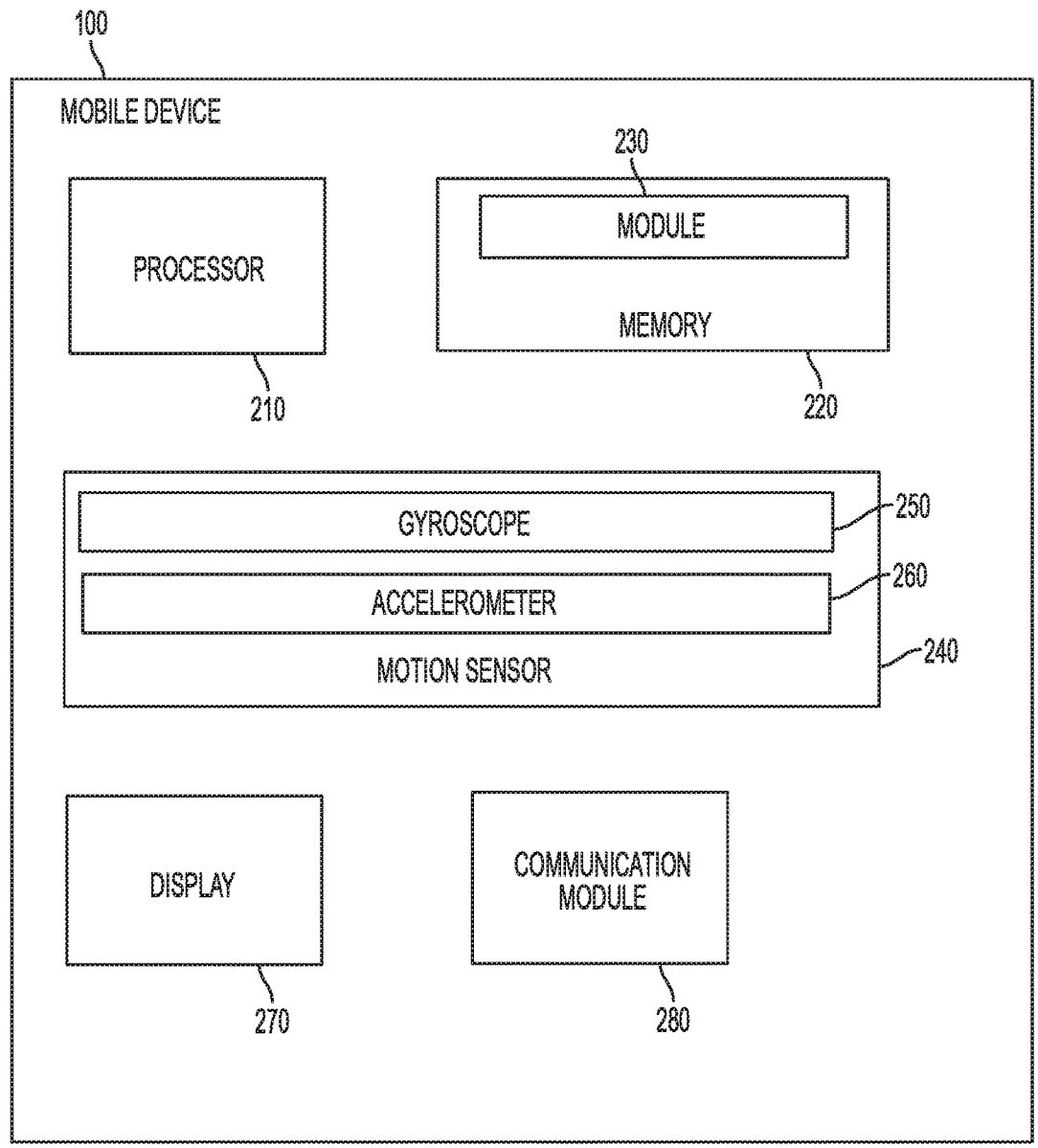
FIG. 2 depicts a block diagram of exemplary components that may be found within the mobile device according to some embodiments of the present disclosure.

FIG. 2 shows a block diagram of exemplary components that can be found within the mobile device 100, according to some embodiments of the present disclosure. These components can include a processor 210, a memory 220, one or more motion sensors 240, a display 270, a communication module 280. Mobile device 100 can include additional modules, fewer modules, or any other suitable combination of modules that perform any suitable operation or combination of operations.

In some embodiments, processor 210 can include one or more cores and can accommodate one or more threads to run various applications and modules. Software can run on processor 210 capable of executing computer instructions or computer code. Processor 210 can also be implemented in hardware using an application specific integrated circuit (ASIC), programmable logic array (PLA), field programmable gate array (FPGA), or any other integrated circuit.

Memory 220 can be a non-transitory computer readable medium, flash memory, a magnetic disk drive, an optical drive, a programmable read-only memory (PROM), a read-only memory (ROM), or any other memory or combination of memories. Memory 220 can include one or more modules 230.

Processor 210 can be configured to run module 230 stored in memory 220 that is configured to cause processor 210 to perform various steps that are discussed throughout the present disclosure, such as for example, the methods described in connection with FIG. 5.

In some embodiments, mobile device 100 can include one or more motion sensors 240. For example, motion sensors 240 can include a gyroscope 250 and an accelerometer 260. In some embodiments, motion sensor 240 can include a magnetometer. In some embodiments, accelerometer 260 can be a three-axis accelerometer that measures linear acceleration in up to three-dimensions (for example, x-axis, y-axis, and z-axis). In some embodiments, gyroscope 250 can be a three-axis gyroscope that measures rotational data, such as rotational movement and/or angular velocity, in up to three-dimension (for example, yaw, pitch, and roll). In some embodiments, the magnetometer can be a three-axis magnetometer that measures magnetic field in up to three-dimensions. In some embodiments, accelerometer 260 can be a microelectromechanical system (MEMS) accelerometer, and gyroscope 250 can be an MEMS gyroscope. Processor 210 of mobile device 100 can receive motion information from one or more motion sensors 240 to track acceleration, rotation, position, or orientation information of mobile device 100 in six degree of freedom through three-dimensional space. In some embodiments, processor 210 can track acceleration, rotation, position, or orientation information of mobile device 100 in nine degree of freedom through three-dimensional space.

In some embodiments, mobile device 100 can include other types of sensors. For example, mobile device 100 can include an altimeter or barometer, or other types of location sensors, such as a GPS sensor.

Mobile device 100 can also include display 270. Display 270 can be a screen, such as a crystalline (e.g., sapphire) or glass touchscreen, configured to provide output to the user as well as receive input from the user via touch.

Mobile device 100 can also include a communication module 280. Communication module 280 can be a wireless communication module which includes one or more antennas. In some embodiments, communication module 280 can include a cellular sub-module, which can operate according to a telecommunication standard such as 2G, 3G, Long Term Evolution (LTE®), or 4G. In some embodiments, communication module 290 can include a standard Bluetooth® (IEEE 802.15) sub-module. In some embodiments, communication module 290 can include a Wi-Fi (IEEE 802.11) sub-module.

The modules described above are examples, and embodiments of mobile device 100 can include other modules not shown. For example, some embodiments of mobile device 100 can include a rechargeable battery (e.g., a lithium-ion battery), a microphone or a microphone array, one or more cameras, one or more speakers, etc. In some embodiments, all modules within mobile device 100 can be electrically and/or mechanically coupled together. In some embodiments, processor 210 can coordinate the communication among each module.

Figure 3:
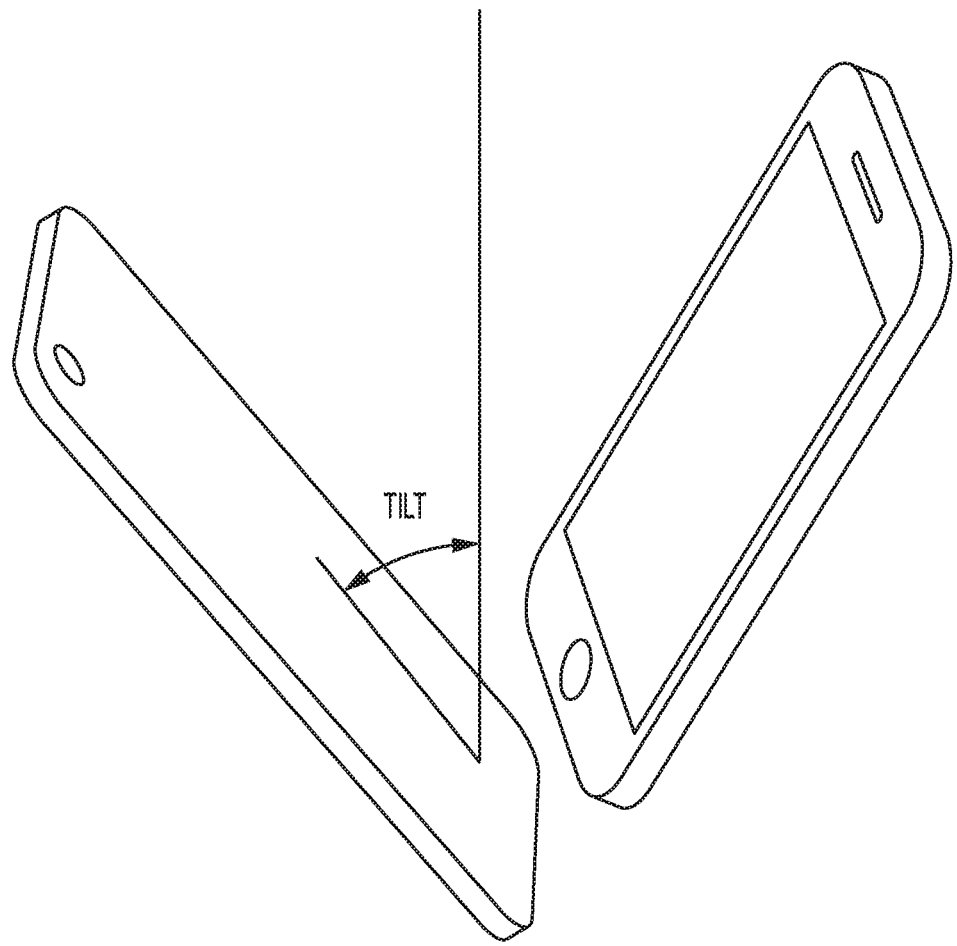
FIG. 3 shows an example of a mobile device tilting from vertical direction according to some embodiments of the present disclosure.

FIG. 3 shows an example of a mobile device 100 tilted from the vertical direction. In some embodiments, the screen tilt angle can be defined as that when the display (i.e., the screen) is vertical, the screen tilt angle is 0 degree, and if the screen is flat to the ground, the screen tilt angle is 90 degrees.

Figure 4:
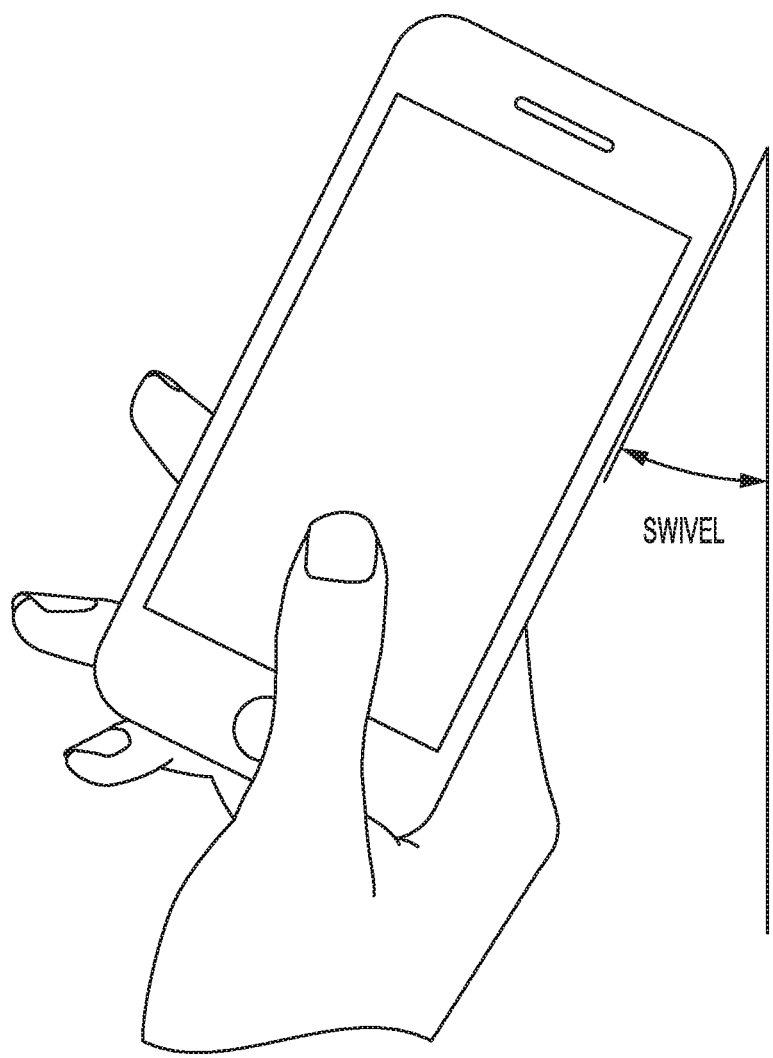
FIG. 4 shows an example of a mobile device swiveling from vertical direction according to some embodiments of the present disclosure.

FIG. 4 shows an example of a mobile device 100 swiveled from the upright portrait. In some embodiments, a screen swivel angle can be defined as the angle between the side edge of the mobile device and the vertical direction. For example, the upper right corner of the mobile device can be regarded as a virtual pivot point and the mobile device can swivel about it. In some embodiments, the screen swivel angle can be defined as positive if the mobile device swivels counterclockwise about its upper right corner. In some embodiments, the screen swivel angle can be defined as negative if the mobile device swivels clockwise about its upper right corner.

Figure 5A:
FIGS. 5A and 5B show examples of a person holding a mobile device.
Figure 5B:
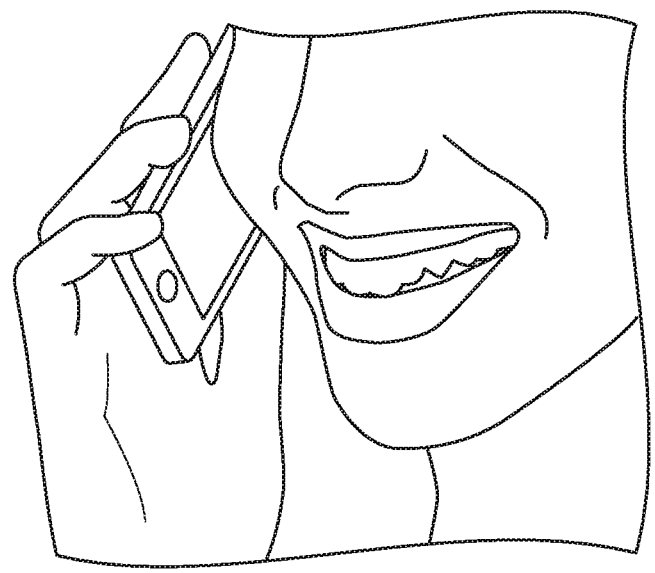

FIG. 5A shows an example of a person holding mobile device 100 to his or her left ear using a left hand. FIG. 5B shows an example of a person holding mobile device 100 to his or her right ear using a right hand.

In some embodiments, a person can have an individual preference for use of a hand, or a dominant hand. For example, the person can be right-handed and prefers to use his or her right hand. As a result, the person can choose to hold the phone during a call with his or her right hand.

In some embodiments, a person can be performing multiple tasks while he or she is in a call, so both hands are used for different tasks. For example, the person can take a note with one hand and hold the mobile device with the other hand. If the person is left-handed, he or she can write with left hand and hold the mobile device with right hand. In some embodiments, the person can hold an item such as a bag with one hand and hold the mobile device with another hand.

In some embodiments, a person can switch the hand which is used to hold the mobile device during a call. For example, the person can pick up and hold the mobile device with one hand to make a call first. After a certain period of time during the call, the person's hand may be sore and he or she can switch to the other hand to hold the mobile device.

The uncertainty of which hand the person is hold the mobile device posed a great challenge to the wireless signal transmission and reception. Because mobile devices are becoming slimmer and more compact, the size of the location of the antenna can be constrained which can affect the performance of the antenna (i.e., radiation pattern, and/or beam width). Therefore, the signal reception and call quality can depend on the relative position and/or orientation between the mobile device and the cell tower with which the mobile device is communicating. As a result, under certain circumstances, the user may have different call quality depending on which hand he or she is using to hold the mobile device, which can cause unpleasant user experiences.

Figure 6:
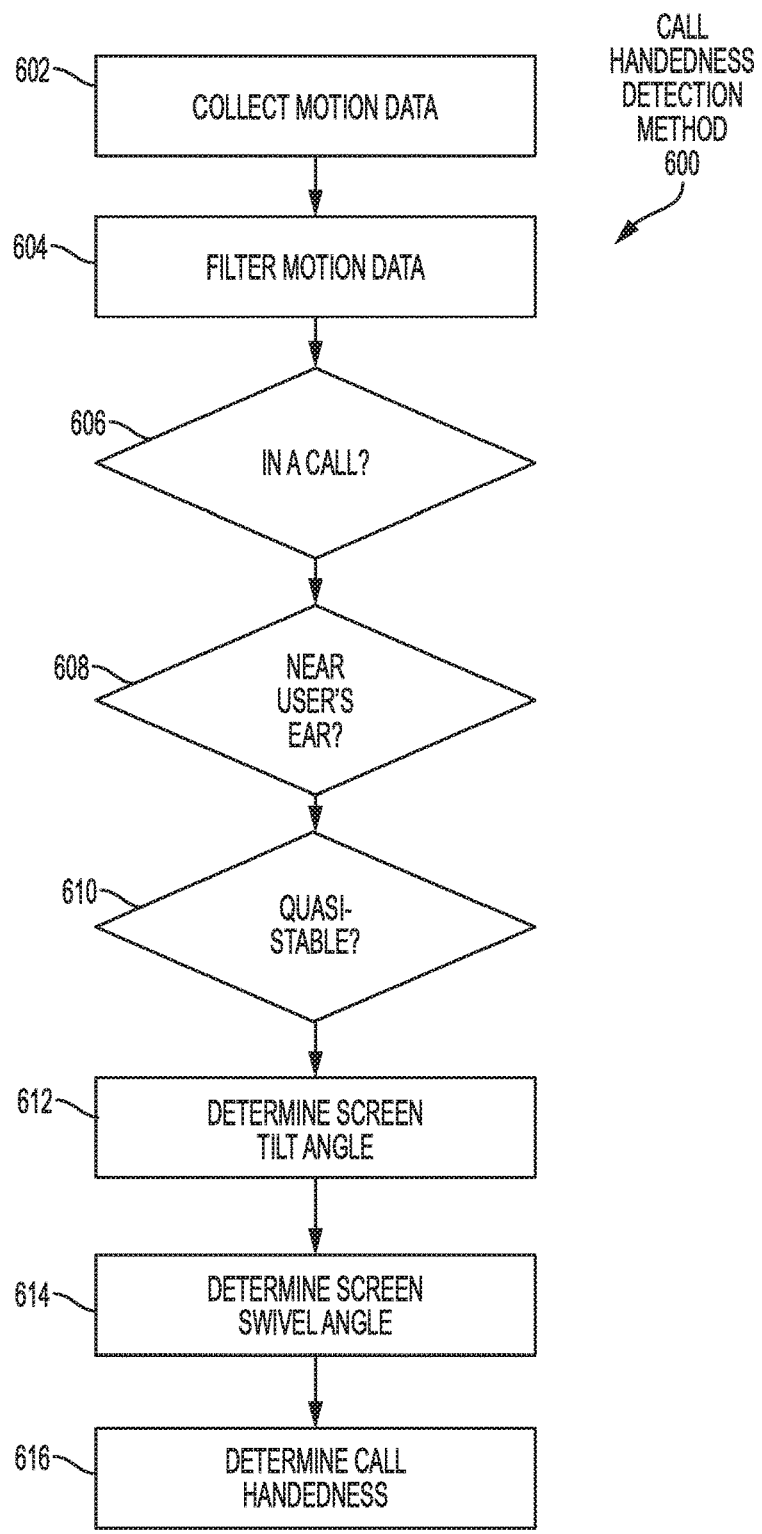
FIG. 6 illustrates a method for detecting call handedness according to some embodiments of the present disclosure.

FIG. 6 is a flow chart illustrating a call handedness detection method 600 according to some embodiments of the present disclosure. In some embodiments, method 600 can be modified by, for example, having blocks combined, divided, rearranged, changed, added, and/or removed. At step 602, motion sensor 240 can collected motion data of the mobile device. In some embodiments, the motion data can be 3-axis accelerations measured by accelerometer 260. In some embodiments, the data output frequency of the accelerometer can be 100 Hz. In some embodiments, the motion data can be rotational data (e.g., angular velocity, or angular acceleration) measured by gyroscope 250.

At step 604, motion data from accelerometer 260 and/or gyroscope 250 can be filtered (e.g., by a high-pass, low-pass, band-pass, or band-stop filter) in order to improve the quality of the motion data. In some embodiments, a low-pass filter can be used to remove unwanted noises and/or interferences. In some embodiments, a low-pass filter with cut-off frequency of 3 Hz can be implemented. In some embodiments, the motion data can be decimated to lower frequency. For example, the motion data can be decimated to 50 Hz.

At step 606, a calling status of mobile device 100 can be determined. In some embodiments, processor 210 can determine if the user is in a call using mobile device 100. If yes, method 600 can proceed to step 608.

At step 608, a position status of mobile 100 can be determined. In some embodiments, a proximity sensor of mobile device 100 can detect a distance between the mobile device and the user, and processor 210 can determine if mobile device 100 is held near the user's ear. For example, the user may be in a call using a speaker of mobile device 100, and mobile device 100 may be put on a flat surface. Thus it can be unnecessary to determine call handedness in this scenario. If it is determined that mobile device 100 is near the user's ear, method 600 can proceed to step 610.

At step 610, processor 210 can determine whether or not the mobile device is in a quasi-stable state. In some embodiments, processor 210 can determine if the acceleration data has a mean value of 1 g. In some embodiments, processor 210 can determine if acceleration data is within a threshold range. In some embodiments, the threshold rage can be 1 g±0.25 g. In some embodiments, processor 210 can determine if a max variance of the acceleration data is less than a threshold value. In some embodiments, processor 210 can estimate a swivel rate based on rotational data from gyroscope 250 and determine if the swivel rate is less than a threshold value. If it is determined that the mobile device is in a quasi-stable state, method 600 can proceed to step 612.

At step 612, a screen tilt angle of mobile device 100 can be determined. In some embodiments, if the screen tilt angle is greater than 55 degrees, mobile device 100 has an unknown call handedness. For example, mobile device may be positioned flat to ground and a call handedness cannot be determined. In some embodiments, a first call handedness detection can require a screen tilt angle less than or equal to 30 degrees.

At step 614, a screen swivel angle of mobile device 100 can be determined. In some embodiments, the screen swivel angle can be defined as positive if mobile device 100 swivels counterclockwise about its upper right corner. In some embodiments, the screen swivel angle can be defined as negative if mobile device 100 swivels clockwise about its upper right corner. In some embodiments, if the screen swivel angle is less than 25 degrees, mobile device 100 has a unknown call handedness 614.

At step 616, a call handedness can be determined based on the screen swivel angle. In some embodiments, if the screen swivel angle is positive, it can be determined that the person is likely to hold mobile device 100 with left hand. In some embodiments, if the screen swivel angle is negative, it can be determined that the person is likely to hold mobile device 100 with right hand.

In some embodiments, the determined call handedness can provide possibilities to dynamically adjust the signal reception and call quality of the mobile device. For example, it may be possible to dynamically tune the antenna gain to compensate certain signal weakening due to mobile device position. In some embodiments, it may also be possible to tune the radiation pattern of the antenna depending on which hand the user is using to hold the mobile device. In some embodiments, it may also be possible to adjust transmission frequency of the antenna. In some embodiments, it may also be possible to adjust the power of the antenna.

In some embodiments, communication module 280 of mobile device 100 can have one or more antennas. Therefore, it is possible that mobile device 100 can switch to different antennas depending on the determined call handedness. For example, four separate antennas can be disposed at each corner of mobile device 100 and the choice of which antenna to be used can be made based on the determined call handedness.

Figure 7:
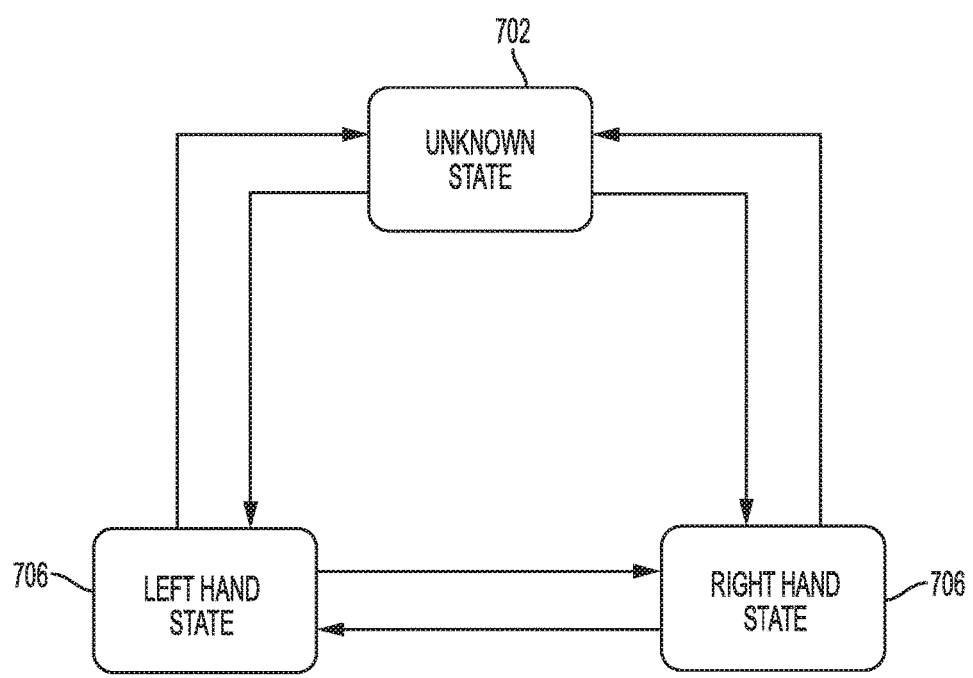
FIG. 7 illustrates inter-state changes among three handedness states according to some embodiments of the present disclosure.

FIG. 7 is a diagram showing pose changes among three call handedness states: unknown state 702, right hand state 704, and left hand state 706. If the screen tilt angle and screen swivel angle are not within pre-defined ranges, mobile device 100 can have an unknown state. If mobile device 100 is not in a quasi-stable state, it can also have an unknown state. In some embodiments, call handedness detection method 600 can keep running in background while the user is in a call. Thus any one of the three states can change to other states. In some embodiments, a state change can be made upon 2 consecutive and consistent detections within a pre-defined threshold time.

In some embodiments, communication module 290 can dynamically adjust one or more of its communication parameters depending on current call handedness state, in order to make sure the user has stable signal reception and high call quality.

The subject matter described herein can be implemented in digital electronic circuitry, or in computer software, firmware, or hardware, including the structural means disclosed in this specification and structural equivalents thereof, or in combinations of them. The subject matter described herein can be implemented as one or more computer program products, such as one or more computer programs tangibly embodied in a propagated signal, for execution by, or to control the operation of, data processing apparatus (e.g., a programmable processor, a computer, or multiple computers). A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub programs, or portions of code). A computer program can be deployed to be executed on one computer or on multiple computers at one site or distributed across multiple sites and interconnected by a communication network.

The processes and logic flows described in this specification, including the method steps of the subject matter described herein, can be performed by one or more programmable processors executing one or more computer programs to perform functions of the subject matter described herein by operating on input data and generating output. The processes and logic flows can also be performed by , and apparatus of the subject matter described herein can be implemented as, special purpose logic circuity, e.g., an FPGA (field programmable gate array) or an ASIC (application specific integrated circuit).

Processors suitable for the execution of a computer program include, by way of example, both general and special purpose microprocessors, and any one or more processor of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. Information carriers suitable for embodying computer program instructions and data include all forms of nonvolatile memory, including by way of example semiconductor memory devices, (e.g., EPROM, EEPROM, and flash memory devices); magnetic disks, (e.g., internal hard disks or removable disks); magneto optical disks; and optical disks (e.g., CD and DVD disks). The processor and the memory can be supplemented by, or incorporated in, special purpose logic circuitry.

To provide for interaction with a user, the subject matter described herein can be implemented on a computer having a display device, e.g., a CRT (cathode ray rube) or LCD (liquid crystal display) monitor, for displaying information to the user and a keyboard and a pointing device, (e.g., a mouse or a trackball), by which the user can provide input to the computer. Other kinds of devices can be used to provide for interaction with a user as well. For example, feedback provided to the user can be any form of sensory feedback, (e.g., visual feedback, auditory feedback, or tactile feedback), and input from the user can be received in any form, including acoustic, speech, or tactile input.

The subject matter described herein can be implemented in a computing system that includes a back end component (e.g., a data server), a middleware component (e.g., an application server), or a front end component (e.g., a client computer having a graphical user interface or a web browser through which a user can interact with an implementation of the subject matter described herein), or any combination of such back end, middleware, and front end components. The components of the system can be interconnected by any form or medium of digital data communication, e.g., a communication network. Examples of communication networks include a local area network ("LAN") and a wide area network ("WAN"), e.g., the Internet.

It is to be understood that the disclosed subject matter is not limited in its application to the details of construction and to the arrangements of the components set forth in the following description or illustrated in the drawings. The disclosed subject matter is capable of other embodiments and of being practiced and carried out in various ways. Also, it is to be understood that the phraseology and terminology employed herein are for the purpose of description and should not be regarded as limiting.

As such, those skilled in the art will appreciated that the conception, upon which this disclosure is based, may readily be utilized as a basis for the designing of other structure, methods, and systems for carrying out the several purposes of the disclosed subject matter. It is important, therefore, that the claims be regarded as including such equivalent constructions insofar as they do not depart from the spirit and scope of the disclosed subject matter.

Although the disclosed subject matter has been described and illustrated in the foregoing exemplary embodiments, it is understood that the present disclosure has been made only by way of example, and that numerous changes in the details of implementation of the disclosed subject matter may be made without departing from the spirit and scope of the disclosed subject matter.

What is claimed is:

1. A method for improving signal reception and call quality of a mobile device while a user is holding the mobile device during a call, the method comprising:
    collecting, by one or more motion sensors of the mobile device, motion data of the mobile device;
    determining, by a processor circuit of the mobile device, one or more constraints are met based on the motion data;
    determining, by the processor circuit , a screen swivel angle of the mobile device based on the motion data;
    determining, by the processor circuit, a handedness of the user while holding the mobile device based on the determined screen swivel angle; and
    adjusting, by the processor circuit, one or more parameters of an antenna of the mobile device based on the determined handedness of the user, wherein the one or more parameters comprise frequency, wherein the adjustment improves the signal reception and call quality of the mobile device.

2. The method of claim 1, wherein the one or more parameters of the antenna comprise at least one of gain, radiation pattern, or power.

3. The method of claim 1, comprising:
    filtering, by the processor circuit, the collected motion data using a low-pass filter, wherein determining the screen swivel angle of the mobile device is based on the filtered motion data.

4. The method of claim 3, wherein the low-pass filter comprises a cut-off frequency of between 1 Hz and 50 Hz.

5. The method of claim 1, wherein determining the one or more constraints are met comprises:
    calculating, by the processor circuit, a screen tilt angle of the mobile device based on the motion data; and
    determining, by the processor circuit, the screen tilt angle is less than a threshold tilt angle.

6. The method of claim 5, wherein the threshold tilt angle is 55 degrees.

7. The method of claim 1, wherein determining the one or more constraints are met comprises:
    determining, by the processor circuit, the screen swivel angle is greater than a threshold swivel angle.

8. The method of claim 7, wherein the threshold swivel angle is 25 degrees.

9. The method of claim 1, wherein determining one or more constraints are met comprises:
    determining, by the processor circuit, a mean acceleration of the mobile device based on the motion data; and
    determining, by the processor circuit, the mean acceleration is within a pre-defined acceleration range.

10. The method of claim 9, wherein the pre-defined acceleration range is 0.75 g to 1.25 g.

11. The method of claim 1, wherein the one or more motion sensors comprise at least one of an accelerometer or a gyroscope.

12. A system for improving signal reception and call quality of a mobile device while a user is holding the mobile device during a call, the system comprising:
- an antenna;
- one or more motion sensors configured to collect motion data of the mobile device; and
- a processor circuit coupled to the antenna and the one or more motion sensors, and configured to execute instructions causing the processor circuit to:
- determine one or more constraints are met based on the motion data;
- determine a screen swivel angle of the mobile device based on the motion data;
- determine a handedness of the user while holding the mobile device based on the determined screen swivel angle; and
- adjust one or more parameters of the antenna based on the determined handedness of the user, wherein the one or more parameters comprise frequency, wherein the adjustment improves the signal reception and call quality of the mobile device.

13. The system of claim 12, wherein the one or more parameters of the antenna comprise at least one of gain, radiation pattern, or power.

14. The system of claim 12, wherein the instructions further cause the processor circuit to:
- filter the collected motion data using a low-pass filter; and
- determine the screen swivel angle of the mobile device based on the filtered motion data.

15. The system of claim 14, wherein the low-pass filter comprises a cut-off frequency of between 1 Hz and 50 Hz.

16. The system of claim 12, wherein the one or more constraints comprise:
- the determined screen swivel angle of the mobile device is greater than a threshold swivel angle.

17. The system of claim 16, wherein the threshold tilt angle is 55 degrees.

18. The system of claim 12, wherein the one or more motion sensors comprise at least one of an accelerometer or a gyroscope.

19. A non-transitory computer-readable medium storing program instructions that are executable to:
- collect, by one or more motion sensors of a mobile device, motion data of the mobile device;
- determine, by a processor circuit of the mobile device, one or more constraints are met based on the motion data;
- determine, by the processor circuit, a screen swivel angle of the mobile device based on the motion data;
- determine, by the processor circuit, a handedness of the user while holding the mobile device based on the determined screen swivel angle; and
- adjust, by the processor circuit, one or more parameters of an antenna of the mobile device based on the determined handedness of the user, wherein the one or more parameters comprise frequency, wherein the adjustment improves the signal reception and call quality of the mobile device.

* * * * *